(12) United States Patent
Park et al.

(10) Patent No.: US 12,207,122 B2
(45) Date of Patent: Jan. 21, 2025

(54) APPARATUS AND METHOD FOR ANALYZING NETWORK DATA RELATED TO TERMINAL IN ROAMING STATE IN WIRELESS COMMUNICATION SYSTEM

(71) Applicant: Samsung Electronics Co., Ltd., Suwon-si (KR)

(72) Inventors: Jungshin Park, Suwon-si (KR); Yoonseon Han, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 371 days.

(21) Appl. No.: 17/767,289

(22) PCT Filed: Oct. 8, 2020

(86) PCT No.: PCT/KR2020/013761
§ 371 (c)(1),
(2) Date: Apr. 7, 2022

(87) PCT Pub. No.: WO2021/071298
PCT Pub. Date: Apr. 15, 2021

(65) Prior Publication Data
US 2022/0369145 A1 Nov. 17, 2022

(30) Foreign Application Priority Data
Oct. 11, 2019 (KR) .................. 10-2019-0126249

(51) Int. Cl.
*H04W 24/10* (2009.01)
(52) U.S. Cl.
CPC .................. *H04W 24/10* (2013.01)
(58) Field of Classification Search
CPC ....... H04W 24/10; H04W 8/08; H04W 88/18; H04W 8/02
See application file for complete search history.

(56) References Cited

U.S. PATENT DOCUMENTS

| 11,310,731 | B1 * | 4/2022 | Feder | H04W 36/32 |
| 12,003,384 | B2 * | 6/2024 | Lair | H04L 41/142 |

(Continued)

FOREIGN PATENT DOCUMENTS

| KR | 10-2021-0029624 A | 3/2021 |
| WO | 2020/071874 A1 | 4/2020 |

OTHER PUBLICATIONS

Samsung, New key issues on support of analytics for roaming UEs, SA WG2 Meeting #135, S2-1909172, Oct. 4, 2019, Split, Croatia.

(Continued)

*Primary Examiner* — Kenneth T Lam
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). The disclosure is to analyze N network data on a UE which is in a roaming state in a wireless communication system. According to various embodiments of the disclosure, a method for operating an apparatus for a network data analytics function (NWDAF) belonging to a first network in a core network of a wireless communication system is provided. The method comprises: transmitting a first message requesting network data for a terminal to a core network device belonging to a second network; receiving a second message including the network data from the core network device; and transmitting a third message including an analytics result of the network data to a consumer network function (NF).

8 Claims, 12 Drawing Sheets

(56) References Cited

U.S. PATENT DOCUMENTS

| | | | |
|---|---|---|---|
| 2019/0222489 A1 | 7/2019 | Shan | |
| 2020/0196155 A1* | 6/2020 | Bogineni | H04L 41/12 |
| 2020/0358670 A1* | 11/2020 | Lee | H04L 41/5067 |
| 2021/0076320 A1 | 3/2021 | Park et al. | |
| 2022/0022026 A1* | 1/2022 | Sharma | H04W 8/12 |
| 2022/0086257 A1* | 3/2022 | Fu | G06F 9/5077 |
| 2022/0337486 A1* | 10/2022 | Hong | H04L 41/14 |
| 2022/0345865 A1* | 10/2022 | Munoz De La Torre Alonso | H04W 48/16 |

OTHER PUBLICATIONS

Samsung, New key issue: NWDAF performance improvement using NF feedback, SA WG2 Meeting #135, 82-1909181, Oct. 4, 2019, Split, Croatia.

Huawei et al.,, New KIs for Data Collection and Analytics Exposure in Intra-PLMN roaming scenario, SA WG2 Meeting #S2-135, S2-1909287, Oct. 4, 2019, Split, Croatia.

Nokia et al., New key issue for inter NWDAF cooperation, SA WG2 Meeting #135, S2-1909345, Oct. 4, 2019, Split, Croatia.

China Mobile, Procedure Update for Expected UE Behavioural Parameters Provisioning, S2-1901893, 3GPP TSG-SA WG2 Meeting #131, Feb. 19, 2019, Tenerife, Spain.

European Search Report dated Sep. 22, 2022, issued in European Application No. 20873718.9.

European Office Action dated Apr. 3, 2024, issued in European Patent Application No. 20873718.9.

Korean Office Action dated Mar. 20, 2024, issued in Korean Patent Application No. 10-2019-0126249.

* cited by examiner

APPARATUS AND METHOD FOR ANALYZING NETWORK DATA RELATED TO TERMINAL IN ROAMING STATE IN WIRELESS COMMUNICATION SYSTEM

TECHNICAL FIELD

The disclosure relates generally to a wireless communication system and, more par ticularly, to an apparatus and method for analyzing network data for a terminal which is in a roaming state in a wireless communication system.

BACKGROUND ART

To meet the demand for wireless data traffic having increased since deployment of $4^{th}$ generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, the need for a method of automating the management of a 5G mobile communication network has emerged.

DISCLOSURE OF INVENTION

Technical Problem

Based on the above discussion, the disclosure provides an apparatus and method using a network data analytics function (NWDAF) for automating network management in a roaming environment of a terminal in a wireless communication system.

In addition, the disclosure provides an apparatus and method in which an NWDAF determines a roaming state of a terminal in a wireless communication system.

In addition, the disclosure provides an apparatus and method in which an NWDAF collects network data related to a corresponding terminal in a wireless communication system.

Solution to Problem

According to various embodiments of the disclosure, a method for operating an apparatus for a network data analytics function (NWDAF) belonging to a first network in a core network of a wireless communication system is provided. The method comprises: transmitting a first message requesting network data for a terminal to a core network device belonging to a second network; receiving a second message including the network data from the core network device; and transmitting a third message including an analytics result of the network data to a consumer network function (NF).

According to various embodiments of the disclosure, an apparatus for a network data analytics function (NWDAF) belonging to a first network in a core network of a wireless communication system is provided. The apparatus comprises: a transceiver; and at least one processor coupled to the transceiver, wherein the at least one processor is configured to: transmit a first message requesting network data for a UE to a core network device belonging to a second network; receive a second message including the network data from the core network device; and transmit a third message including an analysis result of the network data to a consumer network function (NF).

Advantageous Effects of Invention

An apparatus and a method according to various embodiments of the disclosure may enable analysis of network data for a terminal which is in a roaming state.

Advantageous effects obtainable from the disclosure may not be limited to the above mentioned effects, and other effects which are not mentioned may be clearly understood, through the following descriptions, by those skilled in the art to which the disclosure pertains.

BEST MODE FOR CARRYING OUT THE INVENTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an apparatus and method for collecting and analyzing network data in a wireless communication system. Specifically, the disclosure describes a technique for analyzing network data for a UE which is in a roaming state in a wireless communication system.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, various embodiments of the disclosure will be described using terms and names defined in 3rd generation partnership project (3GPP) standards for the convenience of description. However, various embodiments of the disclosure may be easily modified and applied to other communication systems.

Figure 1:
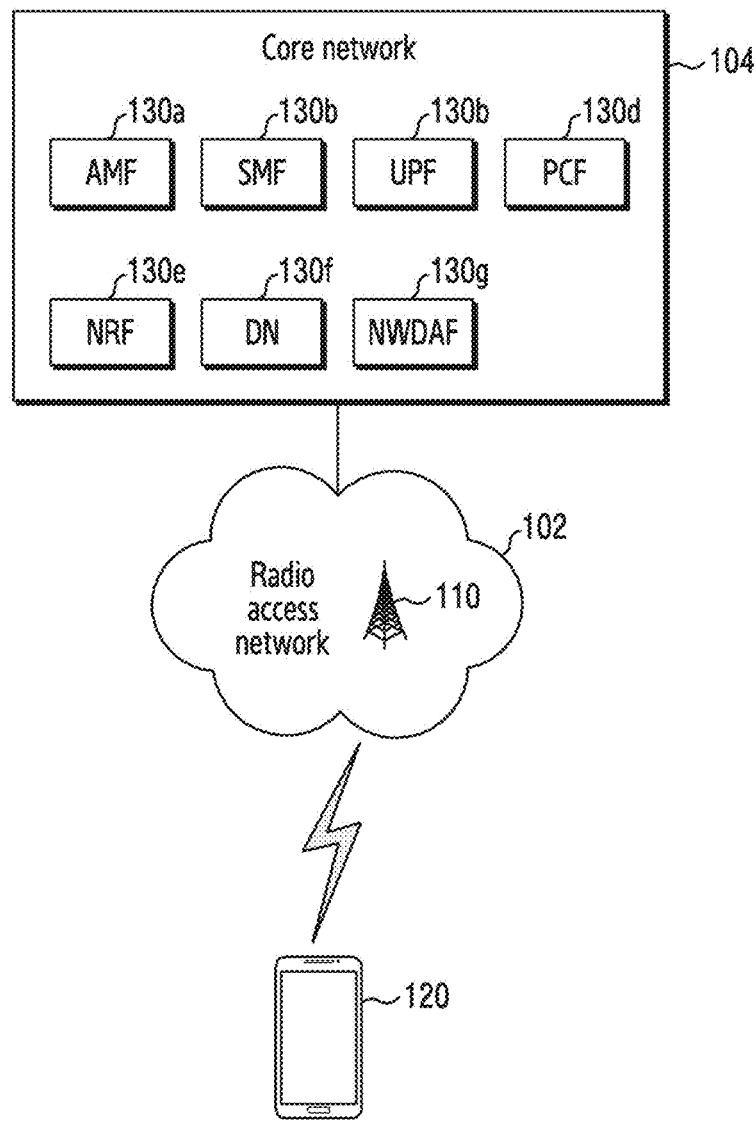
FIG. 1 illustrates a wireless communication system according to various embodiments of the disclosure.

FIG. 1 illustrates a wireless communication system according to various embodiments of the disclosure.

Referring to FIG. 1, a wireless communication system includes a radio access network (RAN) 102 and a core network (CN) 104.

The RAN 102 is a network directly connected to a user device, for example, a UE 120, and is an infrastructure that provides radio access to the UE 120. The RAN 102 includes a set of a plurality of base stations including a base station 110, and the plurality of base stations may perform communication through interfaces formed therebetween. At least some of the interfaces between the plurality of base stations may be wired interfaces or wireless interfaces. The base station 110 may have a structure divided into a central unit (CU) and a distributed unit (DU). In this case, one CU can control a plurality of DUs. The base station may be referred to as an "access point (AP)", a "next generation node B (gNB)", a "5th generation node (5G node)", a "wireless point", or a "transmission/reception point (TRP)", or another term having an equivalent technical meaning, as well as the base station. The UE 120 accesses the RAN 102 and communicates with the base station 110 through a radio channel. The UE 120 may be referred to as "user equipment (UE)", a "mobile station", a "subscriber station", a "remote terminal", a "wireless terminal", or a "user device", or another term having an equivalent technical meaning, as well as the terminal.

The core network 104 is a network that manages the entire system, and controls the RAN 102 and processes data and control signals for the UE 120 transmitted and received through the RAN 102. The core network 104 performs various functions such as control of user plane and control plane, mobility processing, subscriber information management, billing, interworking with other types of systems (e.g., long-term evolution (LTE) systems), etc. In order to perform the above-described various functions, the core network 104 may include a plurality of functionally separated entities having network functions (NFs) different from each other. For example, the core network 104 may include an access management function (AMF) 130a, a session management function (SMF) 130b, a user plane function (UPF) 130c, a policy control function (PCF) 130d, a network repository function (NRF) 130e, a data network (DN) 130f, and a network data analytics function (NWDAF) 130g. The listed functional entities may be implemented with at least one hardware device (e.g., a server). When the functions of a plurality of functional entities are performed in one device, the plurality of functional entities may be implemented by a plurality of virtual machines.

The AMF 130a provides a function for access and mobility management in units of UEs. For example, the AMF 130a may support functions such as signaling between core network entities for mobility between 3GPP access networks, termination of a control plane (CP) interface of a wireless access network, termination of NAS signaling, NAS signaling security (e.g. NAS ciphering and integrity protection), AS security control, registration management (e.g. registration area management), connection management, idle mode UE reachability (e.g., including control and execution of paging retransmission), mobility management control (e.g. subscription and policy), intra-system mobility and inter-system mobility support, support for network slicing, SMF 130B selection, lawful intercept, providing transmission of a session management (SM) message between a UE and the SMF 130B, transparent proxy for SM message routing, access authentication, access authorization including roaming authorization check, providing SMS message transmission between a UE and an SMSF, security anchor function (SEA), security context management (SCM), and the like. Some or all functions of the AMF 130A may be supported within a single instance of one AMF 130A.

The SMF 130B provides a session management function. When a UE has a plurality of sessions, the sessions may be managed by different SMFs 130B. For example, the SMF 130B may support functions such as session management (e.g., establishing, modifying and releasing sessions, including maintaining a tunnel between the UPF 130C and an AN node), UE IP address allocation and management, selection and control of user plane (UP) functions, traffic steering configuration for routing traffic to an appropriate destination in the UPF 130C, termination of an interface towards policy control functions, enforcement of a control part of policy and QoS, lawful intercept (e.g., for an SM event and an interface to an LI system), termination of an SM part of an NAS message, downlink data notification, an initiator of AN specific SM information, determination of an SSC mode of a session, a roaming function, and the like. Some or all functions of the SMF 130B may be supported within a single instance of one SMF 130B.

The UPF 130C transmits a downlink PDU received from the DN 130F to a UE via a radio access network, and transmits an uplink PDU received from the UE via the radio access network to the DN 130F. For example, the UPF 130C may support functions such as an anchor point for intra/inter RAT mobility, an external PDU session point of interconnection to a data network, packet routing and forwarding, user plane part of packet inspection and policy rule enforcement, lawful intercept, traffic usage reporting, an uplink classifier to support routing of a traffic flow to a data network, a branching point to support multi-homed PDU sessions, QoS handling for a user plane (e.g. packet filtering, gating, uplink/downlink rate enforcement), uplink traffic verification (SDF mapping between a service data flow (SDF) and a QoS flow), marking of transport level packets within uplink and downlink, downlink packet buffering and downlink data notification triggering, and the like. Some or all functions of the UPF 130C may be supported within a single instance of one UPF 130C.

The PCF 130D receives information on a packet flow from an application server, and provides a function of determining policies such as mobility management, session management, and the like. For example, the PCF 130D may support functions such as supporting a unified policy framework to control a network operation, providing policy rules so that CP functions (e.g., the AMF 130A, the SMF 130B, etc.) can enforce policy rules, implementing a front end for accessing relevant subscription information for policy determination within a user data repository (UDR).

The DN 130F transmits a downlink protocol data unit (PDU) to the UPF 130C or receives a PDU transmitted from a UE from the UPF 130C. The DN 130F may be understood as, for example, an operator service, an Internet connection, or a 3rd party service.

The NWDAF 130G provides a function for collecting and analyzing network data. The NWDAF 130G collects, from AFs and NFs, network data and local analytics information of each NF through a service-based interface. If necessary, the NWDAF 130G may collect network data to a data storage such as UDR and a 5G orchestration management, generate big data for a network, and transmit information obtained by analyzing/processing the big data to required NFs and AFs through a service-based interface.

Hereinafter, in various embodiments of the disclosure, a function provided by any one of the aforementioned NFs may be referred to as a "service". In addition, one instance may support one or more services. If each service is implemented in the form of an identifiable instance, the service may be referred to as a "service instance". Service instances providing the same service can be grouped into a service set. Service instances belonging to one service set may exchange or share context with each other and provide the same service. In addition, instances providing the same service may constitute a set together, and instances belonging to one set may exchange or share context with each other and provide the same service. In addition, between instances belonging to the same service set or set, service continuity or IP address preservation for a UE may be supported even when the service or instance changes according to the mobility of the UE or a network state change.

The instance is an object that can be identified by realizing the NF defined in the 3GPP standard. That is, an instance may be understood as a hardware device implemented to perform an operation for at least one service and transmit and receive information. Thus, an instance may be referred to as a "device" or a "node". That is, a device or a node can be understood as an instance in a virtualized system. One instance may support one or more services, and each service may also be realized, and thus the service may be separated and implemented into at least one service instance in an identifiable form. If the service is implemented as an instance, the service instance can be included in the instance. Accordingly, in describing various embodiments of the disclosure, terms such as "instance", "service instance", "device", and "node" may be used interchangeably.

Figure 2:
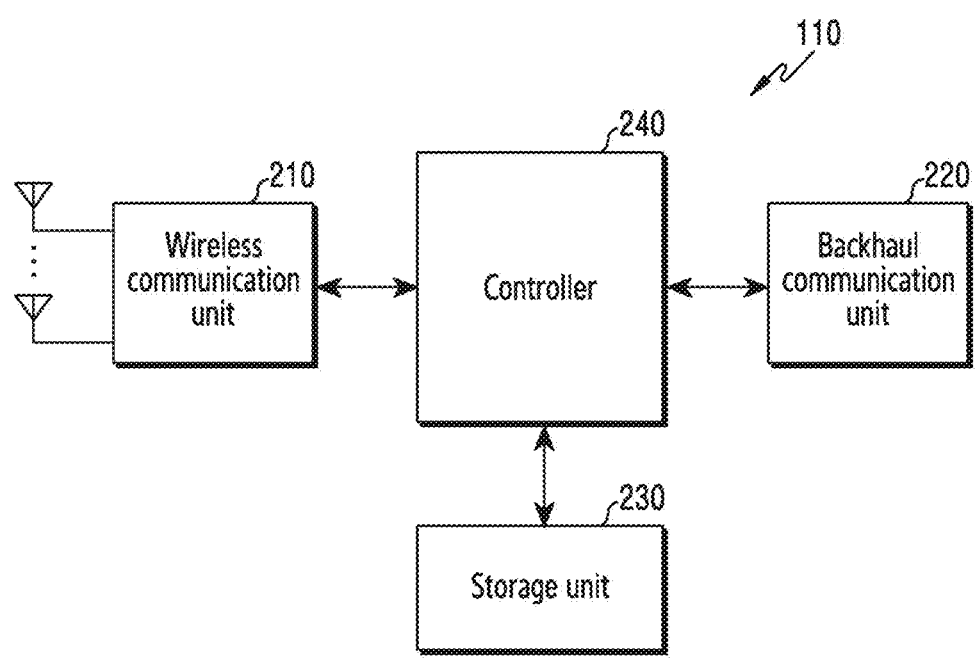
FIG. 2 illustrates a configuration of a base station in a wireless communication system according to various embodiments of the disclosure.

FIG. 2 illustrates a configuration of a base station in a wireless communication system according to various embodiments of the disclosure. The configuration illustrated in FIG. 2 can be understood as the configuration of the base station 110. Hereinafter, terms such as "unit", " . . . -or(-er)", etc., refers to a unit that processes at least one function or operation, which may be implemented by hardware or software, or a combination of hardware and software.

Referring to FIG. 2, the base station includes a wireless communication unit 210, a backhaul communication unit 220, a storage unit 230, and a controller 240.

The wireless communication unit 210 performs functions for transmitting and receiving signals through a wireless channel. For example, the wireless communication unit 210 performs a conversion function between a baseband signal and a bit stream according to the physical layer standard of the system. For example, when transmitting data, the wireless communication unit 210 generates complex symbols by encoding and modulating a transmission bit stream. In addition, when receiving data, the wireless communication unit 210 restores a received bit stream through demodulation and decoding of the baseband signal.

In addition, the wireless communication unit 210 up-converts the baseband signal into a radio frequency (RF) band signal and then transmits the RF band signal through an antenna, and down-converts the RF band signal received through the antenna into a baseband signal. To this end, the wireless communication unit 210 may include a transmission filter, a reception filter, an amplifier, a mixer, an oscillator, a digital to analog convertor (DAC), an analog to digital convertor (ADC), and the like. In addition, the wireless communication unit 210 may include a plurality of transmission/reception paths. Further, the wireless communication unit 210 may include at least one antenna array constituted of a plurality of antenna elements.

In terms of hardware, the wireless communication unit 210 may be constituted of a digital unit and an analog unit, and the analog unit may be constituted of a plurality of sub-units according to operating power and operating frequency. The digital unit may be implemented with at least one processor (e.g., a digital signal processor (DSP)).

The wireless communication unit 210 transmits and receives signals as described above. Accordingly, all or part of the wireless communication unit 210 may be referred to as a "transmitter", a "receiver", or a "transceiver". In addition, in the following description, transmission and reception performed through a wireless channel are used in a sense including the processing as described above which is performed by the wireless communication unit 210.

The backhaul communication unit 220 provides an interface for performing communication with other nodes in a network. That is, the backhaul communication unit 220 converts a bit stream transmitted from a base station to another node, for example, another access node, another base station, an upper node, a core network, etc., into a physical signal, and converts the physical signal received from the other node into a bit string.

The storage unit 230 stores data such as a basic program, an application program, and configuration information for the operation of the base station. The storage unit 230 may be composed of a volatile memory, a nonvolatile memory, or a combination of a volatile memory and a nonvolatile memory. In addition, the storage unit 230 provides stored data according to the request of the controller 240.

The controller 240 controls overall operations of the base station. For example, the controller 240 transmits and receives signals through the wireless communication unit 210 or the backhaul communication unit 220. In addition, the controller 240 records and reads data in the storage unit 230. In addition, the controller 240 may perform functions of a protocol stack required by a communication standard. According to another implementation example, the protocol stack may be included in the wireless communication unit 210. To this end, the controller 240 may include at least one processor. According to various embodiments, the controller 240 may control the base station to perform operations according to various embodiments to be described later.

Figure 3:
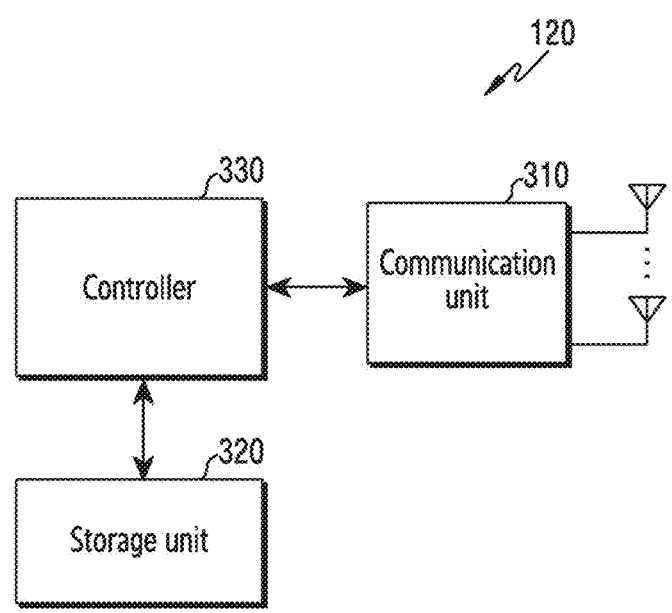
FIG. 3 illustrates a configuration of a UE in a wireless communication system according to various embodiments of the disclosure.

FIG. 3 illustrates a configuration of a UE in a wireless communication system according to various embodiments of the disclosure. The configuration illustrated in FIG. 3 can be understood as the configuration of the UE 120. Hereinafter, terms such as "unit", " . . . -or(-er)", etc., refers to a unit that processes at least one function or operation, which may be implemented by hardware or software, or a combination of hardware and software.

Referring to FIG. 3, the UE includes a communication unit 310, a storage unit 320, and a controller 330.

The communication unit 310 performs functions for transmitting and receiving signals through a wireless channel. For example, the communication unit 310 performs a conversion function between a baseband signal and a bit stream according to the physical layer standard of the system. For example, when transmitting data, the communication unit 310 generates complex symbols by encoding and modulating a transmission bit stream. In addition, when receiving data, the communication unit 310 restores a received bit stream through demodulation and decoding of a baseband signal. In addition, the communication unit 310 up-converts the baseband signal into an RF band signal and transmits the RF band signal through an antenna, and down-converts the RF band signal received through the antenna into a baseband signal. For example, the communication unit 310 may include a transmission filter, a reception filter, an amplifier, a mixer, an oscillator, a DAC, an ADC, and the like.

In addition, the communication unit 310 may include a plurality of transmission/reception paths. Furthermore, the communication unit 310 may include at least one antenna array constituted of a plurality of antenna elements. In terms of hardware, the communication unit 310 may be constituted of a digital circuit and an analog circuit (e.g., a radio frequency integrated circuit (RFIC)). Here, the digital circuit and the analog circuit may be implemented in one package. In addition, the communication unit 310 may include a plurality of RF chains. Furthermore, the communication unit 310 may perform beamforming.

The communication unit 310 transmits and receives signals as described above. Accordingly, all or part of the communication unit 310 may be referred to as a "transmitter", a "receiver", or a "transmitter". In addition, in the following description, transmission and reception performed through a wireless channel are used in a sense including the processing as described above which is performed by the communication unit 310.

The storage unit 320 stores data such as a basic program, an application program, and configuration information for the operation of the UE. The storage unit 320 may be composed of a volatile memory, a nonvolatile memory, or a combination of a volatile memory and a nonvolatile memory. In addition, the storage unit 320 provides stored data according to the request of the controller 330.

The controller 330 controls overall operations of the UE. For example, the controller 330 transmits and receives signals through the communication unit 310. In addition, the controller 330 records and reads data in the storage unit 320. In addition, the controller 330 may perform functions of a protocol stack required by the communication standard. To this end, the controller 330 may include at least one processor or a micro- processor, or may be a part of a processor. In addition, a part of the communication unit 310 and the controller 330 may be referred to as a communication processor (CP). According to various embodiments, the controller 330 may control the UE to perform operations according to various embodiments to be described later.

Figure 4:
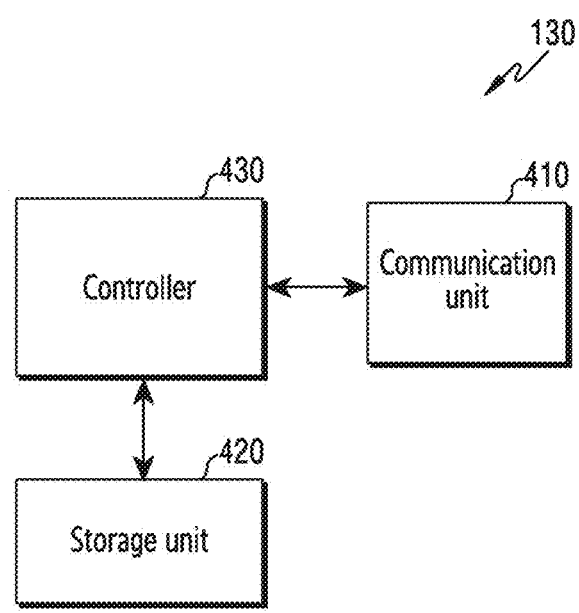
FIG. 4 illustrates a configuration of a core network device in a wireless communication system according to various embodiments of the disclosure.

FIG. 4 illustrates a configuration of a core network device in a wireless communication system according to various embodiments of the disclosure. The structure illustrated in FIG. 4 can be understood as a configuration of a device having the function of at least one of the AMF 130a, the SMF 130b, the UPF 130c, the PCF 130d, the NRF 130e, the DN 130f, and the NWDAF 130g of FIG. 1. Hereinafter, terms such as "unit", " . . . -or(-er)", etc., refers to a unit that processes at least one function or operation, which may be implemented by hardware or software, or a combination of hardware and software.

Referring to FIG. 4, the core network device includes a communication unit 410, a storage unit 420, and a controller 430.

The communication unit 410 provides an interface for performing communication with other devices in the network. That is, the communication unit 410 converts a bit stream transmitted from the core network device to another device into a physical signal, and converts a physical signal received from another device into a bit stream. That is, the communication unit 410 may transmit and receive signals. Accordingly, the communication unit 410 may be referred to as a "modem", a "transmitter", a "receiver", or a "transceiver". In this case, the communication unit 410 enables the core network device to communicate with other devices or systems through a backhaul connection (e.g., wired backhaul or wireless backhaul) or through a network.

The storage unit 420 stores data such as a basic program, an application program, and configuration information for the operation of the core network device. The storage unit 420 may be composed of a volatile memory, a nonvolatile memory, or a combination of a volatile memory and a nonvolatile memory. In addition, the storage unit 420 provides stored data according to the request of the controller 430.

The controller 430 controls overall operations of the core network device. For example, the controller 430 transmits and receives signals through the communication unit 410. In addition, the controller 430 records and reads data in the storage unit 420. To this end, the controller 430 may include at least one processor. According to various embodiments, the controller 430 may control the core network device to perform operations according to various embodiments described later.

Figure 5:
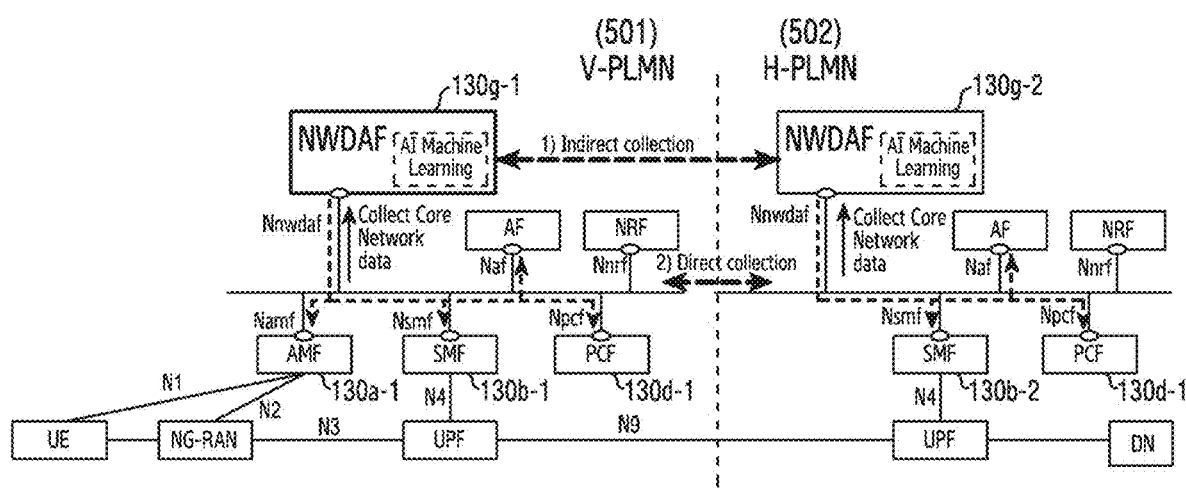
FIG. 5 illustrates an example of a connection structure between a home network and a roaming network in a wireless communication system according to various embodiments of the disclosure.

FIG. 5 illustrates an example of a connection structure between a home network and a roaming network in a wireless communication system according to various embodiments of the disclosure. FIG. 5 illustrates a structure of a wireless communication network system to which the illustrated network automation function is applied for description of various embodiments. Each element function of the network such as AMF, SMF, OAM, RAN, etc., that constitutes a wireless network can be a consumer NF requesting the analytics result of the NWDAF, and the NWDAF is responsible for collecting and analyzing data from each NF to generate the analytics result requested from the consumer NF. The NWDAF transmits the analytics result to the consumer NF that sent the request, so that the consumer NF utilizes the analytics result received from the NWDAF in the process of determining control parameters and operations. When a UE is in a roaming state, an AMF 103*a*-1, an SMF 130*b*-1, a PCF 130*d*-1, and an NWDAF 130*g*-1 belonging to a visited public land mobile network (V-PLMN) 501 which is a roaming network to which a UE is currently connected in a roaming state may exist. In addition, an SMF 130*b*-2, a PCF 130*d*-2, and an NWDAF 130*g*-2 belonging to a home public land mobile network (H-PLMN) 502 which is a home network may exist. Depending on the session type of the UE, the AF may exist in the roaming network in case of a local breakout session and may exist in the home network in case of a home routed session, respectively. In order for the NWDAF to generate analytics data for a UE which is in a roaming state (hereinafter, referred to as a "roaming UE"), a method of collecting UE-related network state data from each NF is required. The disclosure provides an indirect collection model that collects roaming network and home network data between the NWDAFs of a roaming network and a home network, respectively, and transmits the collected data to a counterpart, and a direct collection model in which the NWDAF belonging to a roaming network or a home network collects data directly from a required NF through an inter-network interface.

Figure 6:
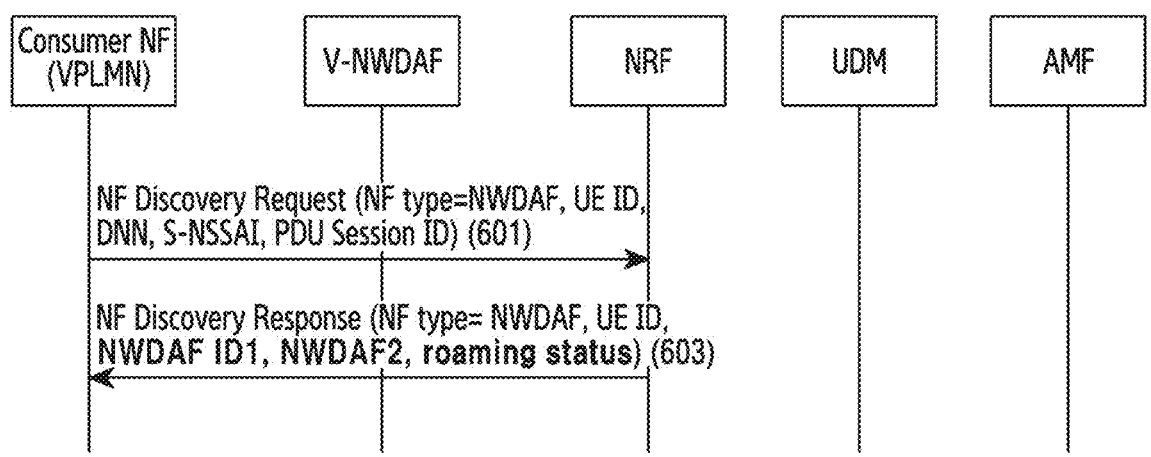
FIG. 6 illustrates a procedure in which a consumer NF transmits an NF registration function (NRF) and a control message in order to receive information on a data analytics function which is to request analytics data for a roaming UE in a wireless communication system according to various embodiments of the disclosure.

FIG. 6 illustrates a procedure in which a consumer NF transmits an NF registration function (NRF) and a control message in order to receive information on a data analytics function which is to request analytics data for a roaming UE in a wireless communication system according to various embodiments of the disclosure. FIG. 6 illustrates signal exchange when the indirect collection model is applied.

The procedure illustrated in FIG. 6 is a procedure for the above-described consumer NF to apply for a subscription to receive analytics data to the NWDAF.

Referring to FIG. 6, in operation 601, a consumer NF located in a V-PLMN transmits an NF discovery request message to an NRF. In operation 603, the NRF transmits an NF discovery response message to the consumer NF. Here, the NF discovery response message may include at least one of an NWDAF ID1, an NWDAF2, and a roaming status indicator. In other words, the consumer NF belonging to the roaming network or the home network may receive information of the NWDAF (e.g., NWDAF ID1) required to proceed with the subscription application from the NRF, and may receive information on the roaming state of the UE which is subjected to network data analytics. In this case, according to an embodiment, the consumer NF may further receive information (e.g., NWDAF2) on the NWDAF belonging to the home network (in the case of a consumer network belonging to the home network, the roaming network) from the NRF.

FIG. 6 illustrates a case in which the consumer NF and the NWDAF receiving an analytics request belong to the roaming network, but even a case in which the consumer NF and the corresponding NWDAF belong to the home network, the same procedure is performed by mutually changing the corresponding home network and roaming network. In the embodiments described below, it is possible to apply the same process to the consumer NF and the NWDAF of the home network and the roaming network by swapping the home network and the roaming network.

Figure 7:
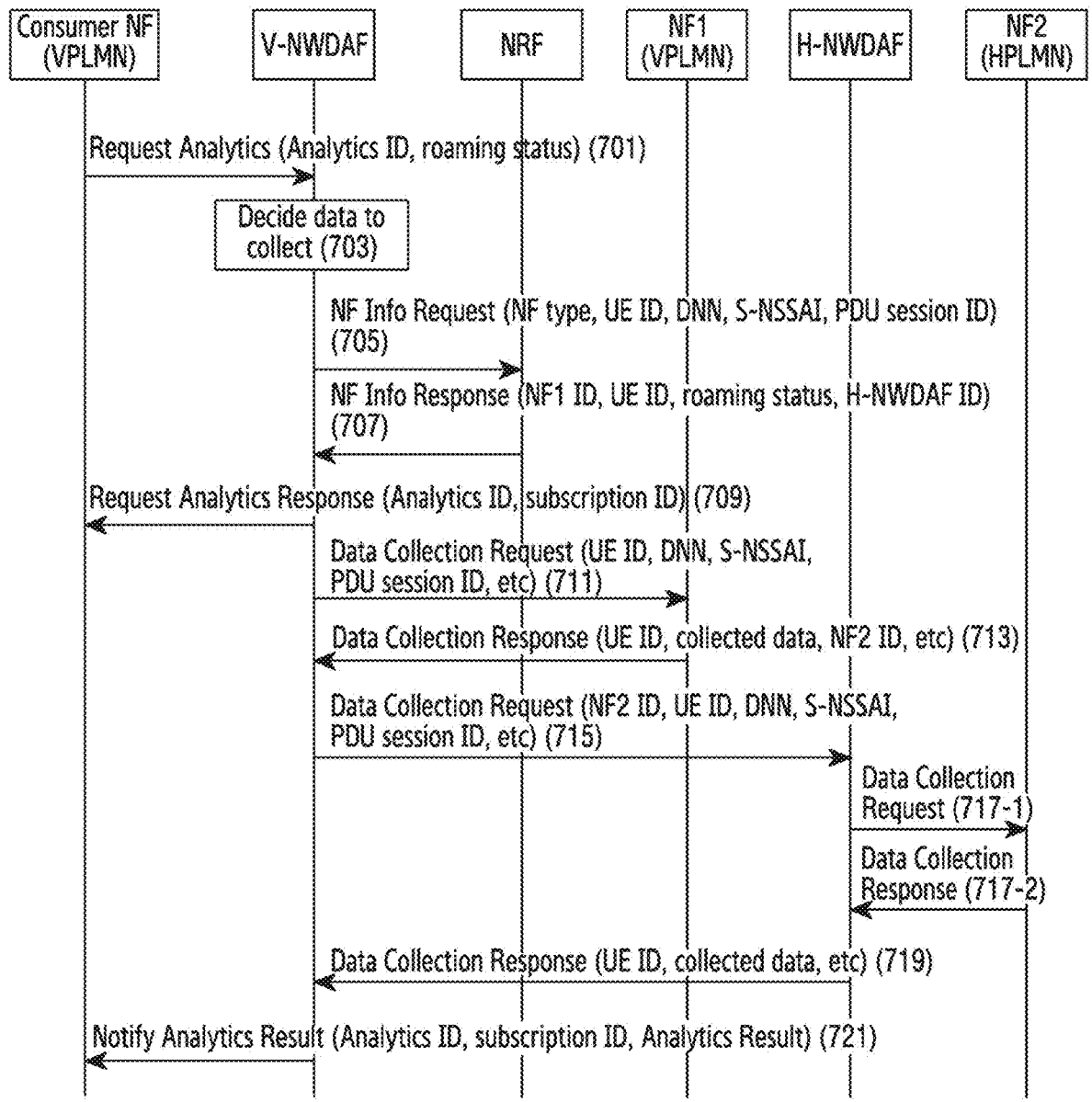
FIG. 7 illustrates a data collection procedure of a network analytics function to which an indirect subscription model is applied in a wireless communication system according to various embodiments of the disclosure.

FIG. 7 illustrates a data collection procedure of a network analytics function to which an indirect subscription model is applied in a wireless communication system according to various embodiments of the disclosure. FIG. 7 schematically illustrates an operation to which an indirect collection model of the proposed scheme is applied. FIG. 7 illustrates a procedure in which a network analytics function receives an analytics result (subscription) request from a consumer NF to collect data and transmits the analytics result to the consumer NF requesting the analytics result. FIG. 7 illustrates a case in which a consumer NF belongs to a roaming network.

Referring to FIG. 7, in operation 701, a consumer NF transmits an analytics request message including information on a roaming state of a UE to an NWDAF of a network (roaming network or home network) to which the consumer NF belongs. The analytics request message may be referred to as a "subscription message". Here, the information on the roaming state may be obtained through a separate procedure. For example, the information on the roaming state may be obtained through the same procedure as in FIG. 6 described above. At this time, when information on the NWDAF of both the home network and the roaming network is received through the procedure shown in FIG. 6, the information on the NWDAF of the home network (if the consumer NF belongs to the home network, the NWDAF of the roaming network) may be further included in the analytics request message.

In operation 703, the NWDAF having received the analytics request message determines data that needs to be collected to generate the analytics result. At this time, if determining that the UE is in a roaming state through the message received in operation 701, the NWDAF requests NWDAF information of the home network for data collection in the home network from the NRF through operations 705 and 707, and receives the NWDAF information. The NF information request message requested from the NRF includes information for requesting information on the NF storing UE information in the roaming network, and the NF information response message includes at least one of information on the corresponding NF, the roaming state of the UE, and NWDAF information (e.g., H-NWDAF ID) belonging to the home network in case of the roaming UE. According to another embodiment, if H-NWDAF ID information has already been transmitted to the NWDAF of the roaming network through the consumer NF in operations 701 and 703, the corresponding information may be omitted in operation 707.

In operation 709, the NWDAF transmits an analytics request response message to respond the fact that the request analytics of the consumer NF has been successfully received. In operation 711, the NWDAF transmits a data collection request message, which is a control message requesting data transmission to an NF that needs data collection. At this time, according to the required data type, at least one of a data network name (DNN), single-network slice selection assistance information (S-NSSAI), and a PDU session ID may be included as information for specifying the collected data. The DNN is network information to which the UE is connected, the S-NSSAI is information that designates a network slice used by the UE, and the PDU session ID is information that designates a user session for transmitting user packets transmitted by the UE. In operation 713, each NF having received the request message in operation 711 transmits a data collection response message to transmit the collected data to the NWDAF. In this case, the data collection response message may include related NF information (e.g., NF2 ID) in the home network to assist the data collection of the NWDAF for the roaming UE.

In operation 715, the NWDAF transmits a data collection request message for requesting data collection for the corresponding UE to the NWDAF of the home network using the NWDAF information of the home network received in operation 701 or 707. When information on the related NF of the home network is received from the NF through operation 713, the NWDAF may enable information (e.g., NF2 ID) on the corresponding NF of the home network to be included in the data collection request message. In operation 717-1, the NWDAF of the home network requests data collection and transmission to the NF NF2 of the home network, and receives the data collected in operation 717-2.

In operation 719, the NWDAF of the home network transmits a data collection response message to transmit the data collected from the home network to the NWDAF of the roaming network that has requested the data collection. The NWDAF of the roaming network comprehensively analyzes the data collected from the required NF of the roaming network and the home network to generate an analytics result. In operation 721, the network analytics function transmits an analytics result notification message to transmit the analyzed result to the consumer NF requesting the analytics result.

Figure 8:
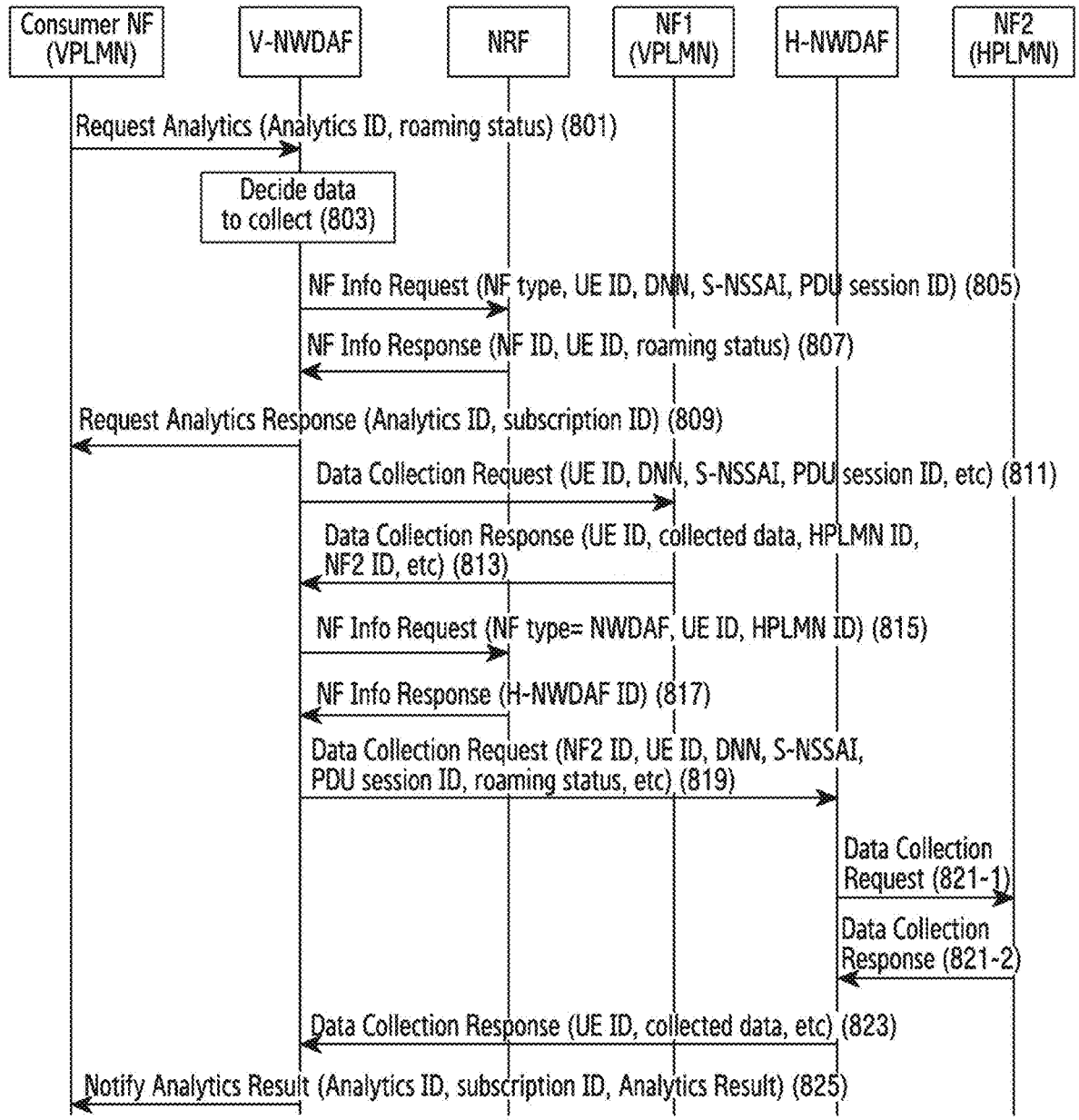
FIG. 8 illustrates a data collection procedure of a network analytics function to which an indirect subscription model is applied in a wireless communication system according to various embodiments of the disclosure.

FIG. 8 illustrates a data collection procedure of a network analytics function to which an indirect subscription model is applied in a wireless communication system according to various embodiments of the disclosure. FIG. 8 schematically illustrates an operation to which the indirect collection model is applied. FIG. 8 illustrates a procedure in which a network analytics function receives an analytics result (subscription) request from a consumer NF, collects data, and transmits the analytics result to the consumer NF having requested the analytics result. FIG. 8 illustrates a case where a consumer NF belongs to a roaming network.

Referring to FIG. 8, in operation 801, the consumer NF transmits an analytics request message including information on the roaming state of a UE to the NWDAF of a network (roaming network or home network) to which the consumer NF belongs. The analytics request message may be referred to as a "subscription message". Here, the information on the roaming state may be obtained through a separate procedure. For example, the information on the roaming state may be obtained through the same procedure as in FIG. 6 described above.

In operation 803, the NWDAF having received the analytics request message determines data that needs to be collected to generate an analytics result. The NWDAF requests NF information for data collection from the NRF through operations 805 and 807, and receives the requested NF information. An NF information request message requested from the NRF includes information for requesting information on the NF storing UE information in the roaming network, and an NF information response message includes at least one of information on the corresponding NF, a roaming state of the UE, and NWDAF information (e.g., H-NWDAF ID) belonging to the home network in case of a roaming UE. According to another embodiment, when the NWDAF receives information on the roaming state of the UE in operation 801, the roaming state information of the UE may not be included in operation 807.

In operation 809, the NWDAF transmits an analytics request response message to respond to the fact that the request analytics of the consumer NF has been successfully received. In operation 811, the NWDAF transmits a data collection request message, which is a control message requesting data transmission to the NF requiring data collection. At this time, according to the required data type, one of a DNN, an SNSSAI, and a PDU session ID may be included as information for specifying the collected data. The DNN is network information to which the UE is connected, the SNSSAI is information that designates a network slice used by the UE, and the PDU session ID is information that designates a user session for transmitting user packets transmitted by the UE. In operation 813, each NF having received the data collection request message transmits a data collection response message to transmit the collected data to the NWDAF. In this case, the data collection response message may include at least one of home network information (e.g., HPLMN ID) for assisting the data collection of the NWDAF for the roaming UE, and related NF information (e.g., NF2 ID) in the home network.

In operations 815 and 817, the NWDAF requests information on the NWDAF of the home network, and receives the requested information. The NRF may pre-store information on the NWDAF installed in the home network of the corresponding UE in the NRF through a roaming agreement between operators or a separate process.

In operation 819, the NWDAF transmits a data collection request message for requesting data collection for the corresponding UE to the NWDAF of the home network. In operation 813, when information on the related NF of the home network (e.g., NF2 ID) is received from the NF, the NWDAF includes information (e.g., NF2 ID) on the corresponding NF in the data collection request message. In operation 821-1, the NWDAF of the home network requests data collection and transmission to the NF2 of the home network, and receives the data collected in operation 821-2.

In operation 823, the NWDAF of the home network transmits the data collected from the home network to the NWDAF of the roaming network that has requested the data collection. The NWDAF of the roaming network comprehensively analyzes the data collected from the required NF of the roaming network and the home network to generate an analytics result. In operation 825, the network analytics function transmits an analytics result notification message to transmit the analytics result to the consumer NF having requested the analytics result.

Figure 9:
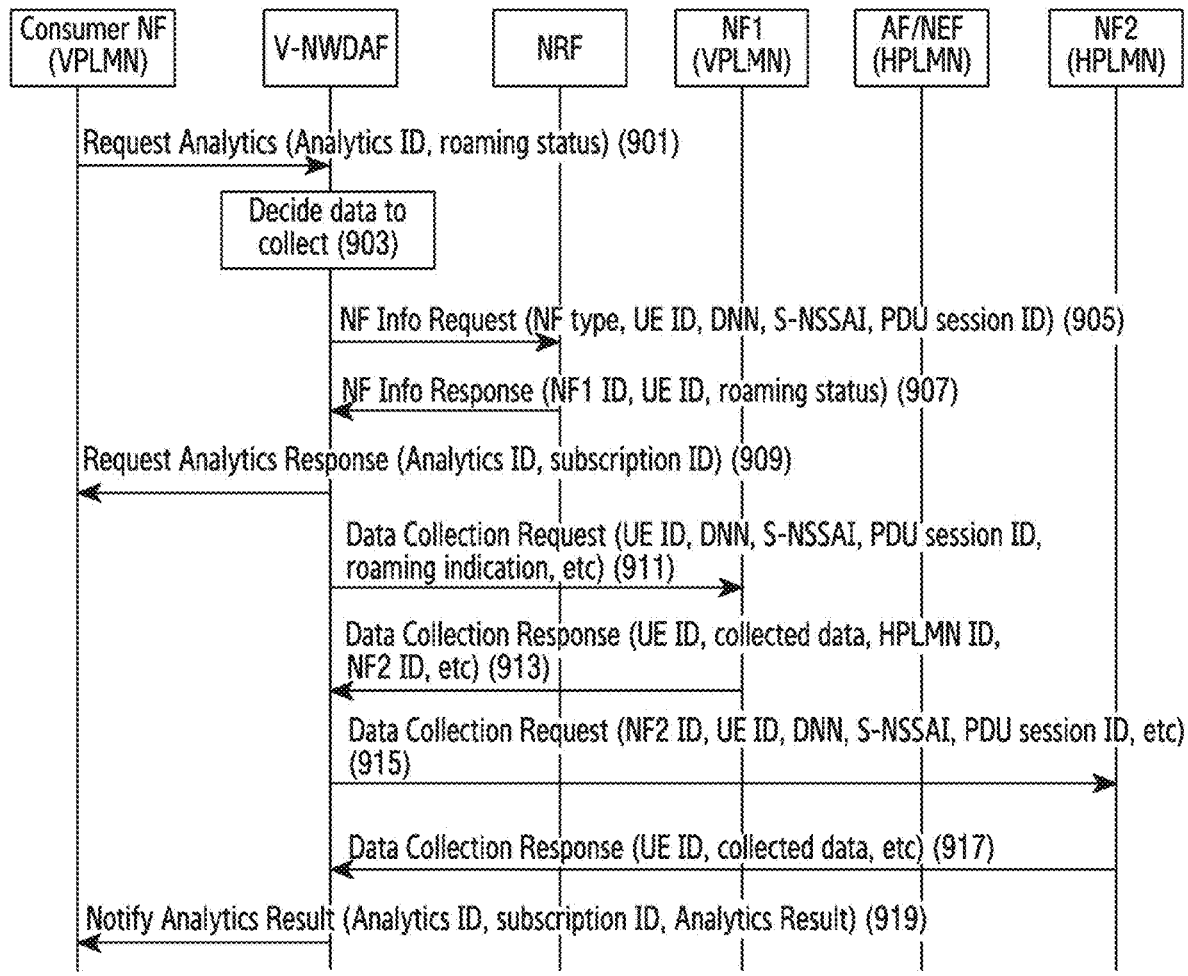
FIG. 9 illustrates a data collection procedure of a network analytics function to which a direct subscription model is applied in a wireless communication system according to various embodiments of the disclosure.

FIG. 9 illustrates a data collection procedure of a network analytics function to which a direct subscription model is applied in a wireless communication system according to various embodiments of the disclosure. FIG. 9 illustrates a procedure in which a network analytics function receives an analytics result (subscription) request from a consumer NF, collects data, and transmits the analytics result to the requested consumer NF. FIG. 9 illustrates a case in which a consumer NF belongs to a roaming network.

Referring to FIG. 9, in operation 901, the consumer NF transmits an analytics request message including information on the roaming state of a UE to the NWDAF of a network (roaming network or home network) to which the consumer NF belongs. The analytics request message may be referred to as a "subscription message". Here, the information on the roaming state may be obtained through a separate procedure. For example, the information on the roaming state may be obtained through the same procedure as in FIG. 6 described above.

In operation 903, the NWDAF having received the analytics request message, the NWDAF determines data that needs to be collected to generate an analytics result. At this time, when it is determined that the UE is in a roaming state through the message received in operation 901, the NWDAF requests NF information of the home network for data collection in the home network through operations 905 and 907 from the NRF, and receives the requested NF information. The NF information request message requested from the NRF includes information for requesting information on the NF storing UE information in the roaming network, and an NF information response message includes information on the corresponding NF and the roaming state of the UE.

In operation 909, the NWDAF transmits a message (to respond the fact that the request analytics of the consumer NF has been successfully received, request analytics response). In operation 911, the NWDAF transmits a data collection request message, which is a control message requesting data transmission to an NF that needs data collection. At this time, according to the required data type, at least one of a DNN, an S-NSSAI, and a PDU session ID may be included as information for specifying the collected data. The DNN is network information to which the UE is connected, the S-NSSAI is information that designates a network slice used by the UE, and the PDU session ID is information that designates a user session for transmitting user packets transmitted by the UE. In addition, the data collection request message may further include an indicator (e.g., roaming indicator) on the roaming state of the UE.

In operation 913, each NF having received the data collection request message transmits a data collection response message to transmit the collected data to the NWDAF. In this case, the data collection response message may include at least one of home network information (e.g., HPLMN ID) for assisting data collection of the NWDAF for the roaming UE and related NF information (e.g., NF2 ID) in the home network.

In operation 915, the NWDAF transmits a data collection request message requesting data collection for the corresponding UE to NF2, which is an NF of the home network. In operation 917, the NF2 of the home network collects data on the corresponding UE, and transmits the collected data to the NWDAF of the roaming network that requested the data. The NWDAF of the roaming network comprehensively analyzes the data collected from the required NF of the roaming network and the home network, and generates an analytics result. In operation 919, the NWDAF transmits an analytics result notification message to transmit the analytics result to the consumer NF having requested the analytics result.

Figure 10:
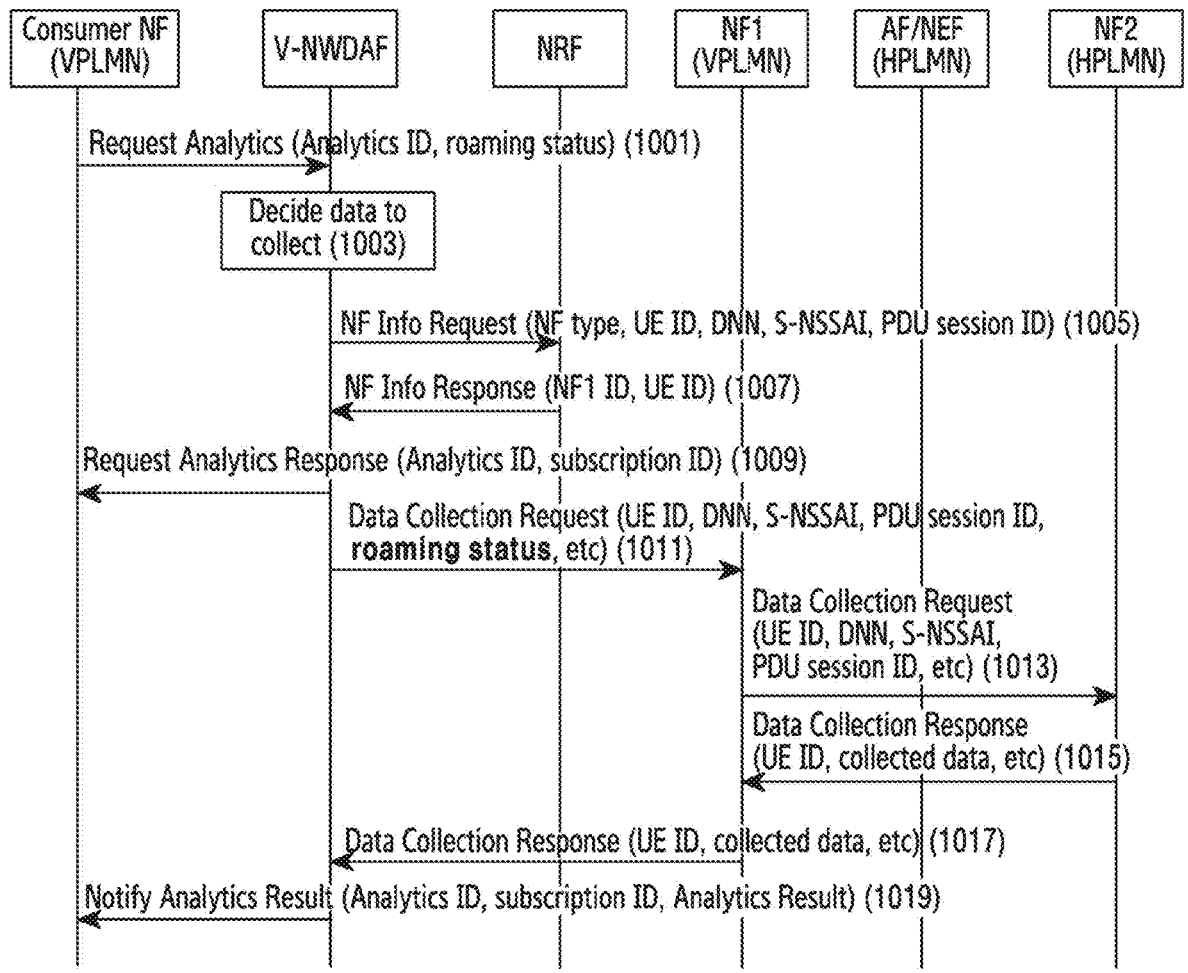
FIG. 10 illustrates a procedure in which a roaming state of a UE is identified through an NF of a roaming network and a network analytics function of the roaming network collects data through a network analytics function of a home network in a wireless communication system according to various embodiments of the disclosure.

FIG. 10 illustrates a procedure in which a roaming state of a UE is identified through an NF of a roaming network and a network analytics function of the roaming network collects data through a network analytics function of a home network in a wireless communication system according to various embodiments of the disclosure. FIG. 10 schematically illustrates the operation of the proposed scheme. FIG. 10 illustrates a procedure in which a network analytics function receives an analytics result (subscription) request from a consumer NF, collects data, and transmits the analytics result to the requested consumer NF. FIG. 10 illustrates a case where a consumer NF belongs to a roaming network.

Referring to FIG. 10, in operation 1001, a consumer NF transmits an analytics request message including information on the roaming state of a UE to the NWDAF of a network (roaming network or home network) to which the consumer NF belongs. The analytics request message may be referred to as a "subscription message". Here, the information on the roaming state may be obtained through a separate procedure. For example, the information on the roaming state may be obtained through the same procedure as in FIG. 6 described above.

In operation 1003, the NWDAF having received the analytics request message determines data that needs to be collected to generate an analytics result. At this time, when it is determined that the UE is in the roaming state through the message received in operation 1001, the NWDAF requests NF information of the home network for data collection in the home network from the NRF, and receives the requested NF information through operations 1005 and 1007. The NF information request message requested from the NRF includes information for requesting information on the NF storing UE information in the roaming network, and an NF information response message includes information on the corresponding NF and the roaming state of the UE.

In operation 1009, the NWDAF transmits an analytics request response message to respond the fact that the request analytics of the consumer NF has been successfully received. In operation 1011, the NWDAF transmits a data collection request message, which is a control message requesting data transmission to an NF that needs data collection. At this time, according to the required data type, at least one of a DNN, an S-NSSAI, and a PDU session ID may be included as information for specifying the collected data. The DNN is network information to which the UE is connected, the S-NSSAI is information that designates a network slice used by the UE, and the PDU session ID is information that designates a user session for transmitting user packets transmitted by the UE. In addition, the data collection request message may further include an indicator (e.g., roaming indicator) on the roaming state of the UE. In addition, the data collection request message may further include roaming state information of the UE to collect data in the home network of the UE.

In operation 1013, each NF having received the data collection request message transmits a data collection request message requesting data collection for the corresponding UE to an NF2 which is an NF of the home network. In operation 1015, the NF2 of the home network collects data on the corresponding UE and transmits the collected data to an NF1 of the roaming network that requested the data. In operation 1017, each NF (e.g., NF1) having received the data collection request message in operation 1011 transmits a data collection response message for transmitting the data collected in the roaming network and the home network using a network data analytics function, to the NWDAF of the roaming network. Accordingly, the NWDAF of the roaming network comprehensively analyzes the data collected from the required NF of the roaming network and the home network, and generates an analytics result. In operation 1019, the NWDAF transmits an analytics result notification message to transmit the analytics result to the consumer NF having requested the analytics result.

Figure 11:
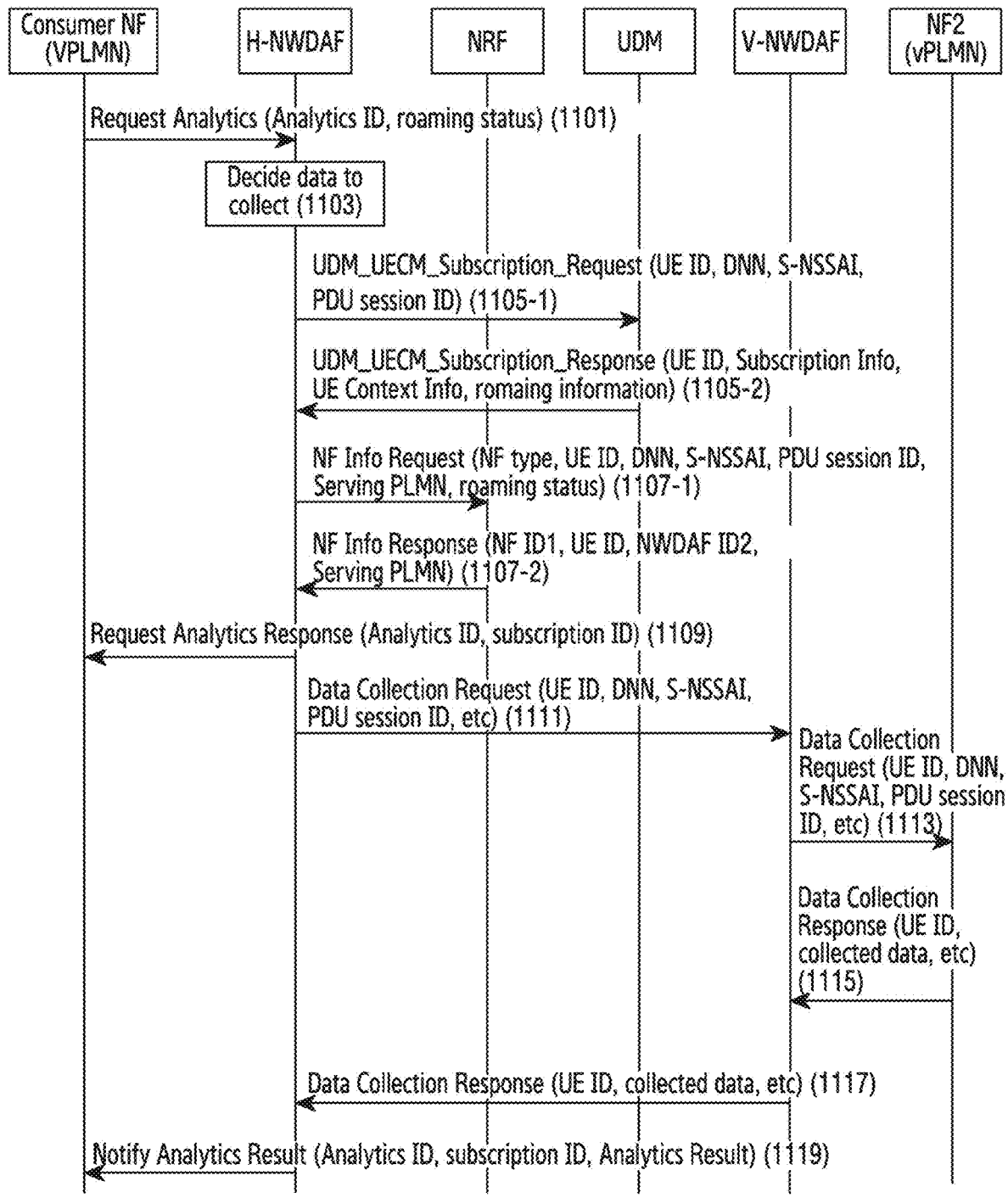
FIG. 11 illustrates a procedure in which a network analytics function of a home network determines a roaming state of a UE using an NF or a user data management (UDM) and collects data through a data analytics function of a roaming network in a wireless communication system according to various embodiments of the disclosure.

FIG. 11 illustrates a procedure in which a network analytics function of a home network determines a roaming state of a UE using an NF or a user data management (UDM) and collects data through a data analytics function of a roaming network in a wireless communication system according to various embodiments of the disclosure. FIG. 11 schematically illustrates an operation to which an indirect collection model of the proposed scheme is applied. FIG. 11 illustrates a procedure in which a network analytics function receives an analytics result (subscription) request from a consumer NF, collects data, and transmits the analytics result to the consumer NF having requested the analytics result.

Referring to FIG. 11, in operation 1101, a consumer NF transmits, to an NWDAF of a home network (roaming network or home network), an analytics request message including information on the roaming state of a UE. The analytics request message may be referred to as a "subscription message". Here, the information on the roaming state may be obtained through a separate procedure. For example, the information on the roaming state may be obtained through the same procedure as in FIG. 6 described above.

In operation 1103, the NWDAF having received the analytics request message determines data that needs to be collected to generate an analytics result. At this time, when it is determined that the UE is in a roaming state through the message received in operation 1101, the NWDAF transmits a subscription request message to a UDM that has stored subscriber state information to identify roaming network information in operations 1105-1 and 1105-2, and receives a subscription response message, thereby obtaining roaming information including the roaming network information of the UE.

In operations 1107-1 and 1107-2, the NWDAF performs operations of requesting NWDAF information of a roaming network for data collection from the NRF and receiving the NWDAF information. The NF information request message requested from the NRF includes at least one of information for requesting information on an NF storing UE information in the home network and serving PLMN, which is a parameter indicating information on the roaming network of the UE. The NF information response message may include at least one of information on the corresponding NF and information (e.g., NWDAF ID2) on the NWDAF installed in the roaming network of the UE. In operation 1109, the NWDAF transmits an analytics request response message to respond the fact that the request analytics of the consumer NF has been successfully received.

In operation 1111, the NWDAF transmits a data collection request message requesting data collection for the corresponding UE to the NWDAF of the roaming network. In operation 1113, the NWDAF of the roaming network transmits a data collection request message requesting data collection and transmission to an NF2 which is the NF of the roaming network. In operation 1115, the NF2 transmits a data collection response message including the collected data.

In operation 1117, the NWDAF of the roaming network transmits a data collection response message to transmit the data collected from the roaming network to the NWDAF of the home network that has requested the data collection in operation 1111. The NWDAF of the home network comprehensively analyzes the data collected from the home network and the roaming network, and generates an analytics result. In operation 1119, the NWDAF of the home network transmits an analytics result notification result to transmit the analyzed result to the consumer NF that has requested the analytics result.

Figure 12:
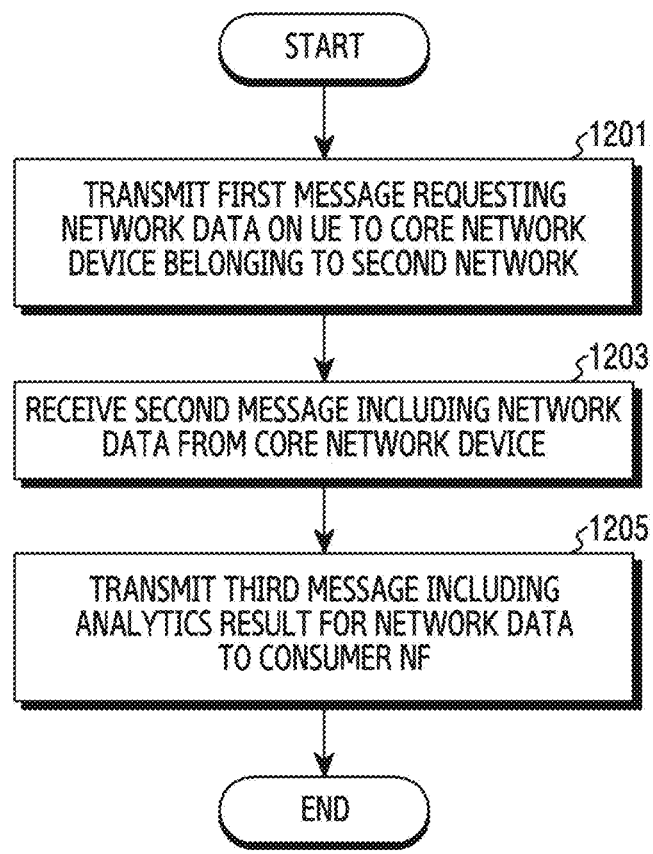
FIG. 12 illustrates an operation process of a network node in a wireless communication system according to various embodiments of the disclosure.

FIG. 12 illustrates an operation process of a network node in a wireless communication system according to various embodiments of the disclosure. Specifically, FIG. 12 illustrates an example of an operation method of an apparatus for a network data analytics function (NWDAF) belonging to a first network in a core network of a wireless communication system.

Referring to FIG. 12, in operation 1201, the NWDAF transmits a first message requesting network data for a UE to a core network device belonging to a second network.

In operation 1203, the NWDAF receives a second message including the network data from the core network device.

In operation 1205, the NWDAF transmits a third message including the analytics result of the network data to the consumer network function (NF).

According to various embodiments of the disclosure, the core network device may be an NWDAF belonging to the second network or a network function (NF) belonging to the second network.

According to various embodiments of the disclosure, the embodiment of FIG. 12 may further include a process of obtaining, by the NWDAF, information indicating that the UE is in a roaming state from a network repository function (NRF).

According to various embodiments of the disclosure, the embodiment of FIG. 12 may further include a process of receiving, by the NWDAF, a fourth message requesting data analysis on the UE from the consumer NF.

According to various embodiments of the disclosure, the fourth message may include information indicating that the UE is in the roaming state.

According to various embodiments of the disclosure, the embodiment of FIG. 12 may further include a process of obtaining, by the NWDAF, information on the NWDAF of the second network from the NRF.

According to various embodiments of the disclosure, the embodiment of FIG. 12 may further include a process of obtaining, by the NWDAF, information on an NF that is to provide network data in the second network from the NF of the first network.

According to the above-described various embodiments, it is possible to utilize the NWDAF through integrated data collection in the home network and the roaming network for the UE which is in the roaming state. In addition, it is possible to improve the accuracy of the NWDAF's NF control and improve the performance of the entire system through integrated analysis of the data collected from the home network and the roaming network.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a first network data analytics function (NWDAF) node belonging to a first network in a wireless communication system, the method comprising:
   receiving, from a consumer network function (NF) node of the first network, a first message including a roaming status indicator of a user equipment (UE), wherein the roaming status indicator indicates whether the UE is in a roaming state;
   transmitting, to the consumer NF node of the first network, a second message in response to the first message in case that a roaming status of the UE is identified based on the first message;
   transmitting, to a second NWDAF node belonging to a second network, a third message requesting second network data of a second network for the UE;
   receiving, from the second NWDAF node, the second network data of the second network; and
   transmitting, to the consumer NF node, an analysis result generated based on first network data of the first network and the second network data of the second network.

2. The method of claim 1, further comprising:
   obtaining, from a network repository function (NRF) node, information indicating that the UE is in the roaming state.

3. The method of claim 1, further comprising:
   obtaining information on the second NWDAF node of the second network from a network repository function (NRF) node.

4. The method of claim 1, further comprising:
   obtaining information on the consumer NF node to which network data is to be provided in the second network, from the consumer NF node of the first network.

5. A first network data analytics function (NWDAF) node belonging to a first network in a wireless communication system, the first NWDAF node comprising:
   a transceiver; and
   at least one processor coupled with the transceiver,
   wherein the at least one processor is configured to:
      receive, from a consumer network function (NF) node of the first network, a first message including a roaming status indicator of a user equipment (UE), wherein the roaming status indicator indicates whether the UE is in a roaming state,
      transmit, to the consumer NF node of the first network, a second message in response to the first message in case that a roaming status of the UE is identified based on the first message,
      transmit, to a second NWDAF node belonging a second network, a third message requesting second network data for a second network for the UE;
      receive, from the second NWDAF node, the second network data of the second network; and
      transmit, to the consumer NF node, an analysis result generated based on first network data of the first network and the second network data of the second network.

6. The NWDAF node of claim 5, wherein the at least one processor is further configured to:
   obtain, from a network repository function (NRF) node, information indicating that the UE is in a roaming state.

7. The NWDAF node of claim 5, wherein the at least one processor is further configured to obtain information on the second NWDAF node of the second network from a network repository function (NRF) node.

8. The NWDAF node of claim 5, wherein the at least one processor is further configured to obtain information on the consumer NF node to which network data is to be provided in the second network, from the consumer NF node of the first network.

* * * * *